Dec. 23, 1969   R. J. ADAMS   3,485,361
CHIP SEPARATOR

Filed Jan. 25, 1968   5 Sheets-Sheet 1

INVENTOR.
ROBERT J. ADAMS
BY
Barnes, Kisselle, Raisch & Choate
ATTORNEYS

Dec. 23, 1969    R. J. ADAMS    3,485,361
CHIP SEPARATOR

Filed Jan. 25, 1968    5 Sheets-Sheet 4

INVENTOR.
ROBERT J. ADAMS
BY
Barnes, Kisselle, Raisch & Choate
ATTORNEYS

INVENTOR.
ROBERT J. ADAMS

ATTORNEYS

United States Patent Office 3,485,361
Patented Dec. 23, 1969

3,485,361
CHIP SEPARATOR
Robert J. Adams, East Detroit, Mich. (% Adams United Corp., 22728 Hoover Road, Warren, Mich. 48089)
Filed Jan. 25, 1968, Ser. No. 700,420
Int. Cl. B07b 7/06, 7/00
U.S. Cl. 209—137                    20 Claims

ABSTRACT OF THE DISCLOSURE

A device for separating workpieces from machining chips, turnings, etc. having a perforated grid on which a mixture of workpieces and chips are deposited with a high pressure chamber below the grid and a low pressure chamber communicating with the top side of the grid. A high velocity air stream is directed upwardly through the grid by a blower which has its inlet connected to the low pressure chamber and its outlet with the high pressure chamber. The grid is disposed so that the bottom side thereof forms one side of a bleed passageway between the high and low pressure chambers to assist in maintaining the bottom side of the perforated grid clear of accumulations.

---

This invention relates to chip separators of the type used for separating machining chips, turnings, etc. from machined workpieces.

In many automated machining operations wherein machined workpieces are discharged from the machine tool into a receptacle it almost invariably happens that some workpieces and bar ends become intermingled with the machining chips so that the workpieces and bar ends must be separated from the machining chips, turnings, etc. One type of device for separating workpieces from machining chips involves the use of a perforated grid on which the mixture of workpieces and chips are deposited and a high velocity air stream directed upwardly through the grid so that the machining chips which are invariably lighter than the workpieces become airborne and thus separated from the workpieces. A chip separator of this type as conventionally designed normally presents several serious problems. One of these problems has to do with the exhaust of the air after the machining chips have been deposited from the air stream. Normally the exhaust air is discharged into the atmosphere outside the building in which the chip separator is located. As a result in the winter time a great deal of heat from within the building is needlessly exhausted into the outside atmosphere. Furthermore, such exhaust air invariably contains a substantial quantity of oil or coolant used in the machining operation and also a substantial quantity of very fine machining chips which are not deposited in the chip separator and which are discharged along with the fine dispersion of oil in the air stream out through the discharge stack on the building and over the surrounding outside area. Thus with a conventionally designed chip separator not only is heat from within the building needlessly dissipated but the discharge of oil and "fines" into the outside atmosphere produces an objectionable nuisance.

Another problem encountered in connection with chip separators as conventionally designed resides in an accumulation of oil coated fines and chips on the underside of the grid which tends to clog the grid perforations and reduce the efficiency of the device to a point where the separator must be shut down periodically to clear the bottom of the grid of such accumulations.

The present invention is directed to the solution of both of these problems. The chip separator of the present invention is designed so that the air utilized for separating the chips from the workpieces circulates in a substantially trapped environment within the device itself and is, therefore, not discharged to the outside atmosphere. The chip separator of the present invention also includes a perforated grid which is disposed so that the underside thereof forms one side of a bleed passageway extending around the grid, as distinguished from through the grid, and the high velocity air stream through this bleed passageway assists in maintaining the bottom side of the grid free of accumulations thereon.

Figure 2:
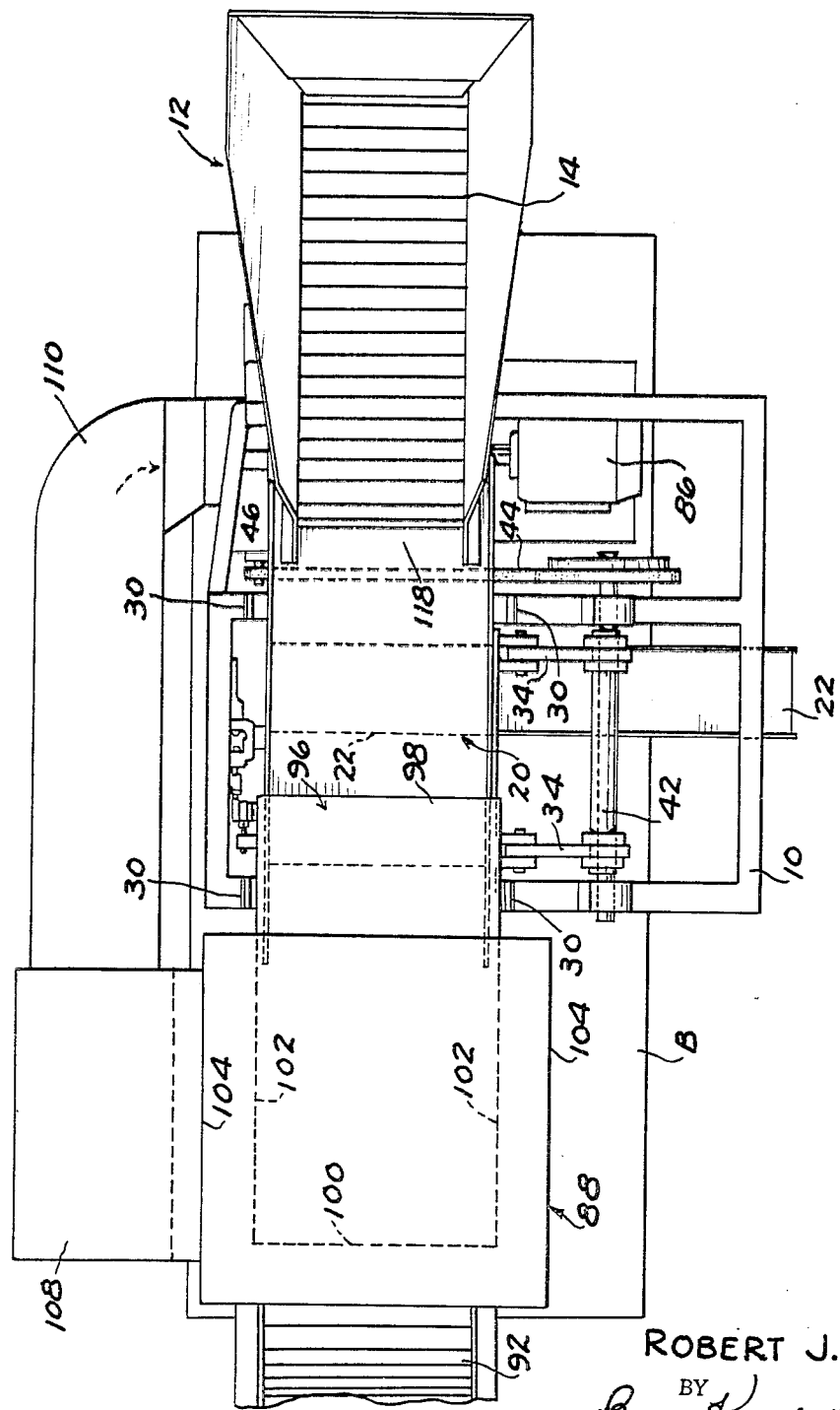
FIGURE 2 is a top plan view of the chip separtor illustrated in FIG. 1.

The chip separator of the present invention includes a base B and a main supporting frame 10 on which an upwardly inclined hopper 12 is supported. Hopper 12 has an endless conveyor 14 along the bottom thereof for elevating and metering chips dumped into the hopper 12 through the open top side 16 to an outlet 18 at the upper end of the hopper. Outlet 18 overlies a metering shaker chute 20 which has a solid bottom wall 22 inclined in a direction downwardly so that its lower end overlies the intermediate portion of a grid 24. The shaker chute 20 has opposite side walls 26 provided with mounting blocks 28 (FIG. 5) on which the lower ends of upright leaf springs 30 are mounted. The upper ends of leaf springs 30 are connected to fixed uprights 32 on frame 10. Four such springs are provided as seen in FIG. 2 so that the shaker chute 20 is suspended on frame 10 solely by these springs. A pair of connecting rods 34 are connected at one end as at 36 to clevis blocks 38 on the side wall 26 of shaker chute 20. The opposite ends of connecting rods 34 are connected with eccentrics 40 on a shaft 42 rotated by a belt drive 44 from an electric motor 46. Thus, when motor 46 is operating the shaker chute 20 is oscillated laterally so that the mixture of workpieces and machining chips deposited on the bottom wall thereof by conveyor 14 gravitates to the lower end thereof and is discharged as a more or less continuous thin stream onto the intermediate portion of grid 24.

Figure 3:
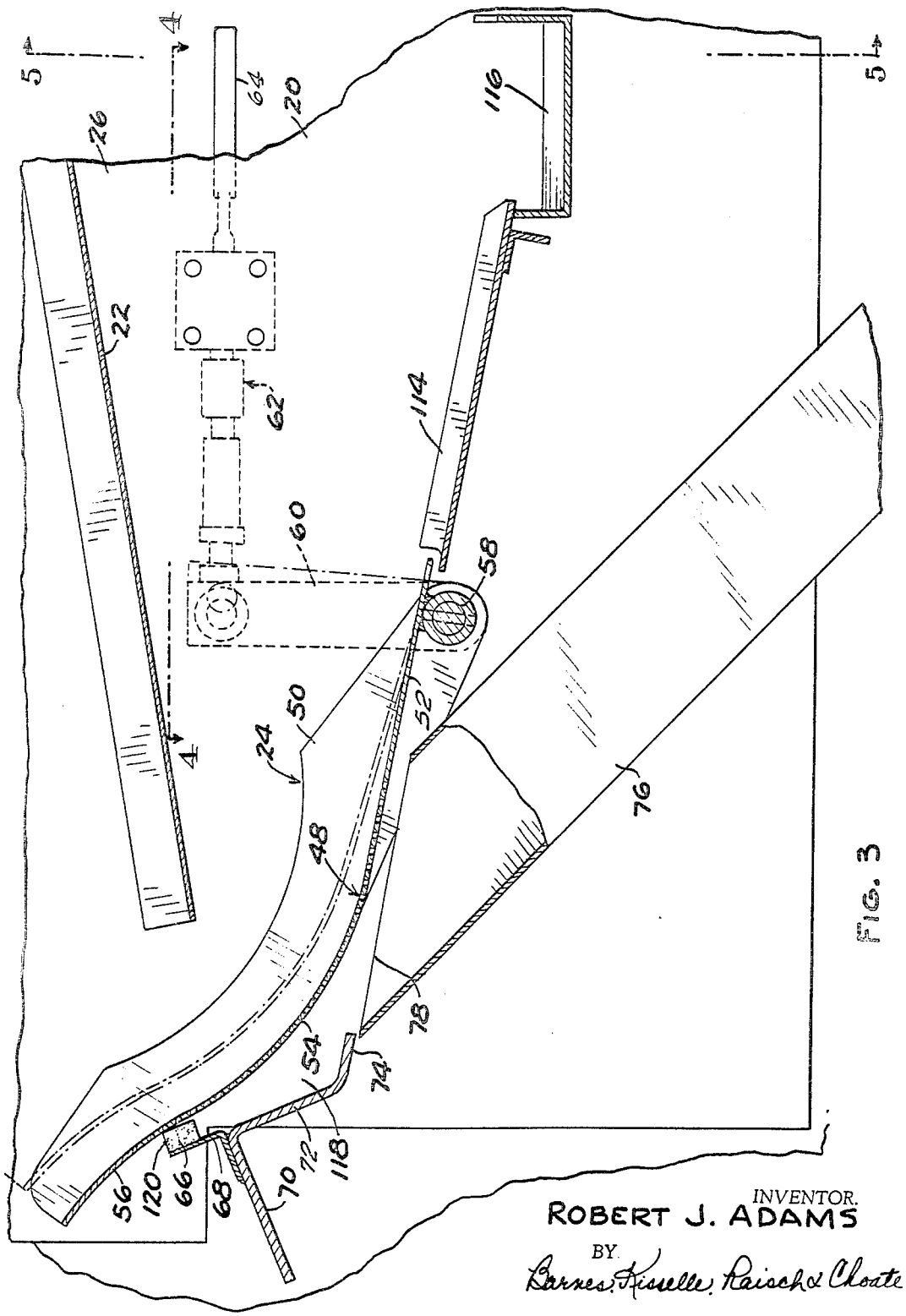
FIGURE 3 is a fragmentary view on an enlarged scale and with portions broken away illustrating the grid arrangement in the chip separator.
Figure 4:
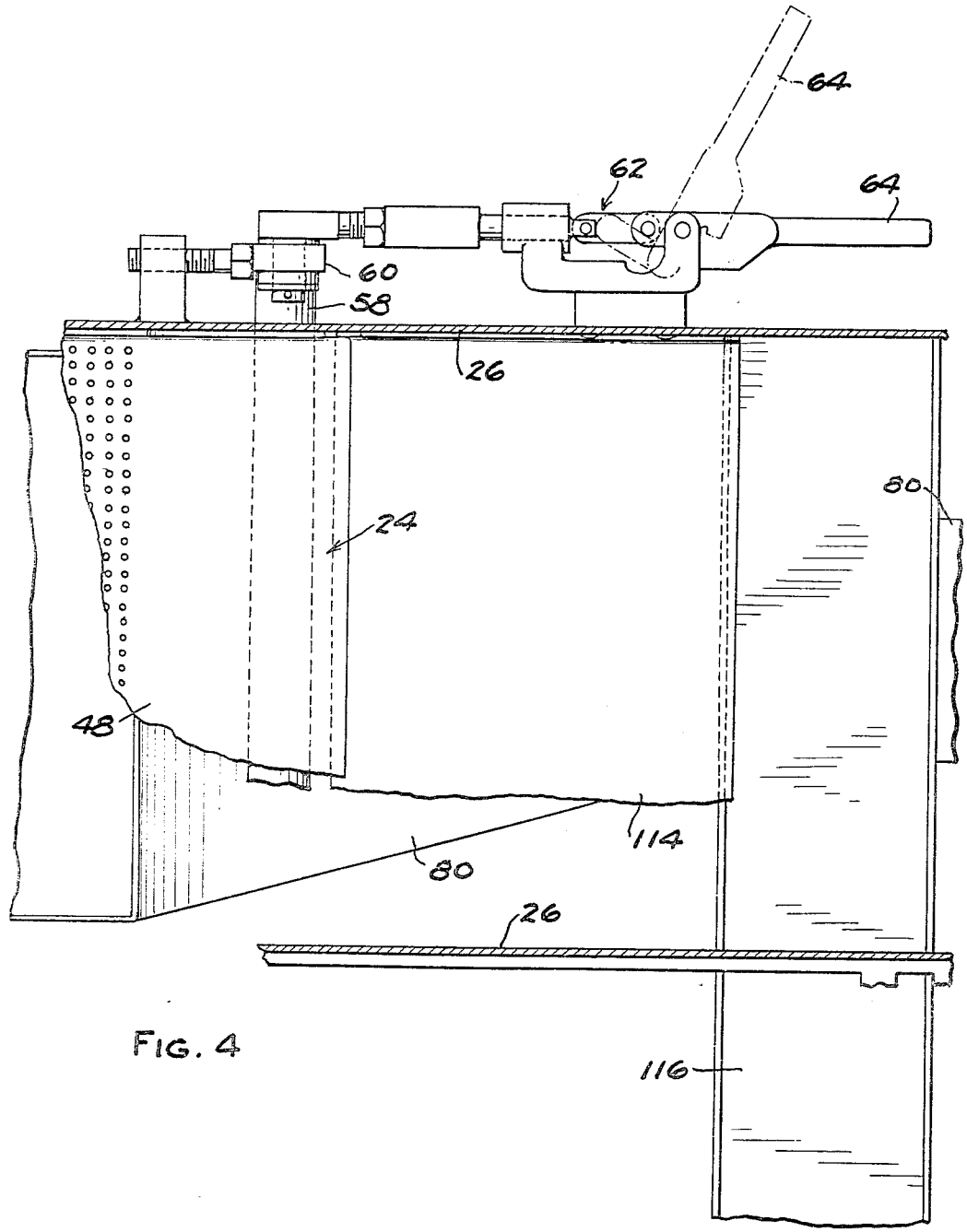
FIGURE 4 is a fragmentary sectional view taken along the line 4—4 in FIG. 3.

As is shown in FIG. 3, grid 24 has a bottom wall 48 and side walls 50. Bottom wall 48 is perforated throughout substantially its entire extent and is generally inclined to the horizontal. The rear end portion 52 of bottom wall 48 is substantially flat. The intermediate portion 54 of bottom wall 48 is curved and more steeply inclined than the rear end portion 52 but inclined to the horizontal at a lesser angle than the upper end portion 56 of bottom wall 48. The upper end portion of bottom wall 48 provides a dam-like obstruction which prevents the workpieces from spilling over the upper end of the grid. Grid 24 is pivotally supported at its rear end on the sidewalls of shaker chute 20 by a rockable shaft 58. As is shown in FIGS. 3 and 4, a crank 60 is keyed to shaft 58 with its upper end connected with a toggle mechanism 62 adapted to be operated by a pivoted crank handle 64. When handle 64 is disposed in the position shown by solid lines in FIG. 4, the upper end portion 56 of bottom wall 48 normally rests against a pair of transversely spaced blocks 66 mounted on an angle iron bracket 68 secured to a frame member 70 extending transversely between the side walls 26 of shaker chute 20. When handle 64 is actuated to the position shown in broken lines in FIG. 4, grid 24 is rocked upwardly to the broken line position illustrated in FIG. 3.

Frame member 70 has a wall portion 72 extending in spaced relation below the intermediate portion 54 of botttom wall 48 and terminating at its lower edge in a lip 74 which registers with the forward edge of an upwardly inclined air duct 76. The outlet of air duct 76 is illustrated at 78 and underlies a substantial portion of the bottom wall 48 of grid 24. The lower end of air duct 76 (FIG. 1), designated 80, is connected with the outlet 82 of a centrifugal blower 84. The impeller of blower 84 is driven by an electric motor 86.

The upper end of grid 24 is disposed within a large, vertically-extending, rectangularly-shaped casing 88. The lower end of casing 88 opens into a hopper 90 at the bottom which there is arranged an endless chip conveyor 92. An open-top oil sump 94 is disposed below chip conveyor 92. The lower end of casing 88 is defined on three sides by a flexible skirt 95, made from neoprene for example, which extends downwardly into hopper 90 and engages the inner faces of the opposite side walls thereof.

Within casing 88 there is arranged a hood 96 having a curved top wall 98, an end wall 100 and two side walls 102. Top wall 98 and side walls 102 extend outwardly from one side of casing 88 and overlie grid 24 and the adjacent end of shaker chute 20. As is best illustrated in FIG. 2, walls 100 and 102 of hood 96 are spaced inwardly from the outer upright side walls 104 of casing 88. Adjacent the upper end of casing 88 one side wall thereof is fashioned with a rather large air outlet 106 to which a vertical return air duct 108 is connected. The lower end of duct 108 is connected by a horizontally extending duct 110 with the centrally disposed inlet 112 of blower 84.

Figure 1:
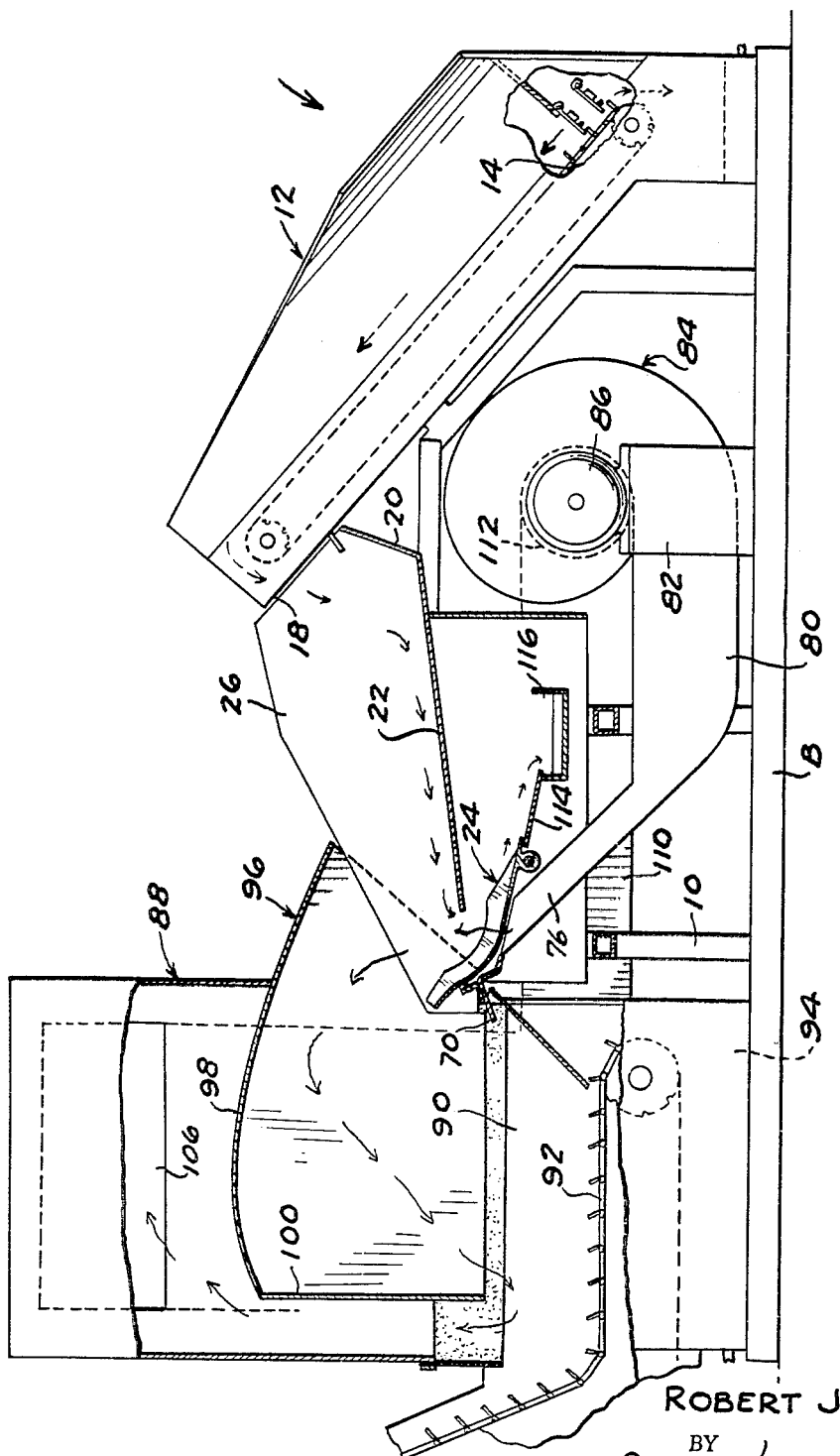
FIGURE 1 is a side elevational view partly in section and with portions broken away illustrating a chip separator according to the present invention.
Figure 5:
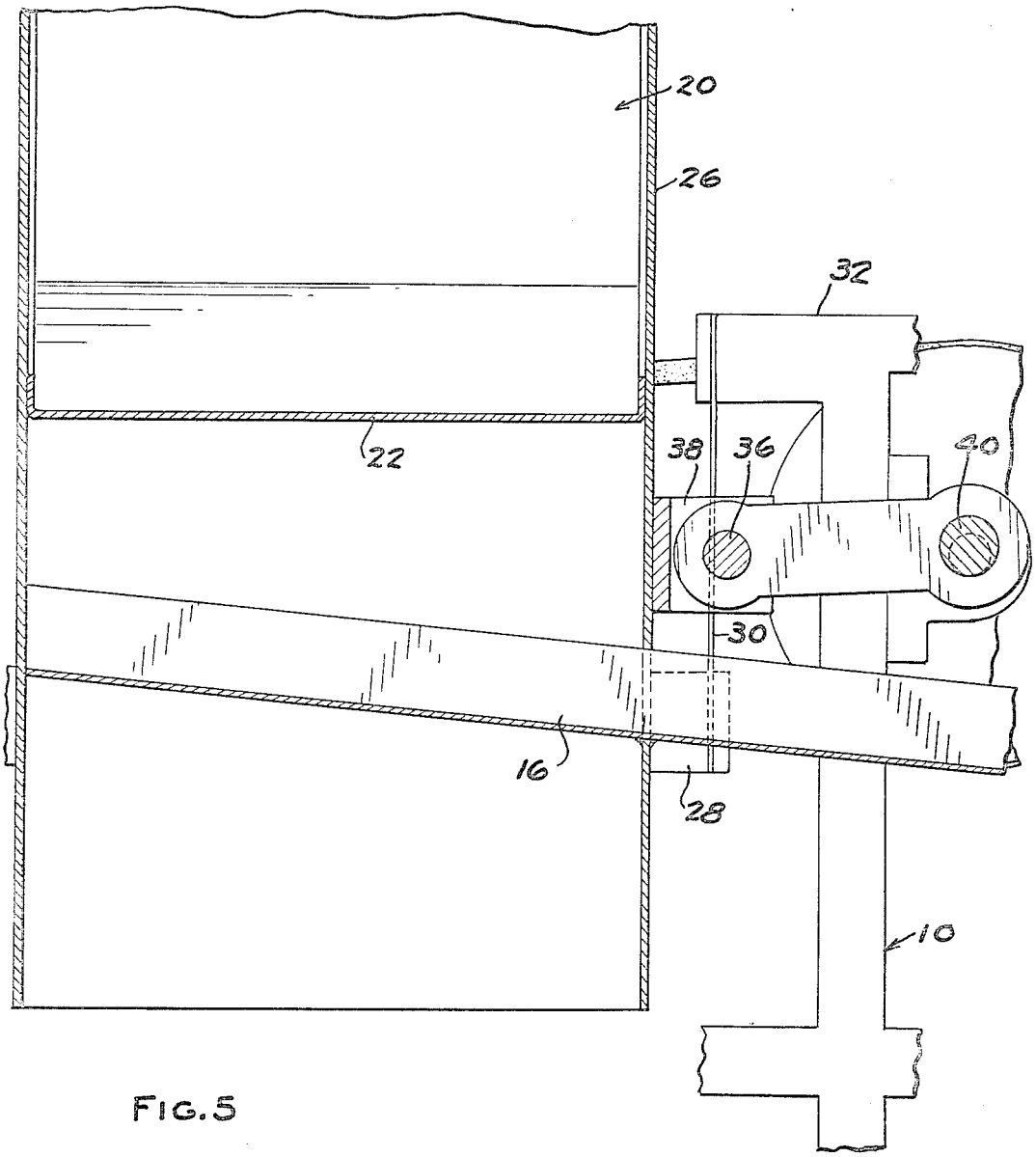
FIGURE 5 is a fragmentary sectional view taken along the line 5—5 in FIG. 3.

Referring to FIGS. 1 and 3, the lower end of grid 24 overlies the upper end of a downwardly inclined ramp 114 which discharges at its lower end into a chute 116. Chute 116 extends transversely of the machine through one of the side walls 26 of shaker chute 20 (FIG. 5). A receptacle (not illustrated) may be located at the lower end of chute 116 to collect the workpieces and any bar ends that may have been mixed therewith.

In operation while blower motor 86, shaker motor 46 and the motors which drive conveyors 92 and 14 are operating, a mixture of workpieces, bar ends, chips, etc. as collected at the machine where the workpieces were machined is dumped into hopper 12 on conveyor 14. This mixture of material is elevated to the upper end of hopper 12 and then discharged through outlet 18 onto the bottom wall 22 of shaker chute 20. Since the whole shaker chute is oscillating laterally, the mixture of the parts and chips on bottom wall 22 tends to spread out and flow as a thin even layer to the lower end thereof where it is discharged as a somewhat continuous stream on the intermediate portion 54 of the oscillating grid 24. The mixture assumes the form of a turbulent and tumbling mass on the intermediate portion 54 of the grid bottom wall 48. The steeply inclined upper portion 56 of bottom wall 48 prevents the whole mass from being simply discharged over the upper edge of the grid. The chips and the fines in the agitated mixture are picked up by a high velocity air stream flowing upwardly through grid 24 and carried into hood 96. The workpieces and the bar ends gravitate along grid 24 to ramp 114 and into chute 116 from which they are discharged into a suitable receptacle.

The cross sectional area of hood 96 is substantially greater than that of air duct 76 so that the velocity of the air after it passes through grid 24 is substantially reduced. In a commercial embodiment of the invention the air velocity in duct 76 is about ten times the air velocity in hood 96. More specifically, in a commercial embodiment of the invention the air velocity in duct 76 is slightly over 3,000 feet per minute while the velocity of the air in hood 96 is only about 300 feet per minute. This very substantial reduction in air velocity coupled with the circuitous path taken by the air as it flows downwardly in hood 96 and then upwardly around the lower edges of hood 96 into casing 18 results in airborne machining chips being deposited on conveyor 92 and a substantial portion of the oil suspended in the air stream is deposited in sump 94. However, some of the oil and very fine chips will be retained in the air stream and directed back through the blower for recirculation. The oil will be continuosly discharged from the recirculating air into sump 94 whereas the extremely fine machining chips have a tendency to accumulate along the bottom side of grid 24. However the wall 72 of frame member 70 (FIG. 3) cooperates with the bottom wall 48 of the grid to form a bleed passageway 118 which extends along the bottom side of bottom wall 48 and discharges into hood 96 through the narrow orifice 120 the width of which is determined by the height of spacer blocks 66. Thus a high velocity air stream wipes the bottom surface of the perforated wall 48 of the grid and carries any accumulation of fine machining chips into hood 96.

With this arrangement if the fines in the air stream should tend to accumulate along the bottom side of the grid, handle 64 can be oscillated to rock the grid plate and thereby jolt them loose so that they are picked up by the air stream through the bleed passageway and are carried into hood 96. The provison of the bleed passageway 118 is particularly desirable in a chip separator of the type disclosed since the air utilized for separating the chips from the workpieces remains in a substantially trapped environment and thus a greater portion of the fines tend to be recirculated as distinguished from a chip separator where the air is exhausted into the atmosphere through a stack extending through the roof of the building.

I claim:

1. In a chip separating device of the type wherein chips and workpieces are deposited on a perforated grid and a high velocity stream of air is directed upwardly through the grid to separate the chips from the workpieces, that improvement which comprises means supporting the grid at an inclination to the horizontal so that workpieces can gravitate to the lower end of the grid, means below the grid forming a high pressure chamber through which said high velocity air stream is directed upwardly, means forming a low pressure chamber above the grid into which the air passing through the grid is directed, means forming a bleed passageway connecting said high and low pressure chambers, the top side of said bleed passageway being defined at least in part by the bottom side of the grid, said bleed passageway having an outlet orifice communicating with said low pressure chamber adjacent the upper end portion of the grid so that a portion of the high velocity air stream is diverted through said bleed passageway to wipe and thereby assist in clearing the bottom side of the grid of accumulations thereon.

2. The combination called for in claim 1 wherein said bleed passageway is substantially co-extensive in width with said grid.

3. The combination called for in claim 1 wherein said means for supporting the grid includes a pivotal support adjacent the lower end of the grid, said grid being pivotable upwardly about said pivotal support to increase the effective cross-sectional area of said bleed passageway.

4. The combination called for in claim 3 including means limiting the pivotal movement of the grid in a downward direction to a predetermined position so as to limit the minimum cross sectional area of said bleed passageway to a predetermined size.

5. The combination called for in claim 1 wherein the upper end portion of the grid adjacent said outlet orifice is more steeply inclined to the horizontal than the portion of the grid intermediate the upper and lower ends thereof.

6. The combination called for in claim 5 including means for depositing said mixture of chips and workpieces on said intermediate portion of the grid.

7. The combination called for in claim 1 wherein said high pressure chamber comprises an air duct having an outlet underlying the intermediate portion of said grid, a wall spaced from and below the bottom side of said grid adjacent the upper end thereof and terminating at its lower end adjacent the outlet of said duct to define one side of said bleed passageway.

8. The combination called for in claim 1 wherein said grid is inclined downwardly from its upper end in a direction laterally away from said low pressure chamber so that when a mixture of workpieces and chips are deposited on the grid the workpieces gravitate laterally toward the lower end of the grid in one direction and the chips are elevated and directed laterally by the high velocity air stream into said low pressure chamber in a lateral direction different from the direction of flow of the workpieces.

9. The combination called for in claim 1 wherein said grid is inclined downwardly from its upper end in a lateral direction generally opposite said low pressure chamber so that when a mixture of workpieces and chips are deposited on the grid the workpieces gravitate laterally toward the lower end of the grid in one direction and the chips are elevated and directed laterally by the high velocity air stream into said low pressure chamber in a lateral direction generally opposite to the direction of flow of the workpieces.

10. The combination called for in claim 1 wherein said high pressure chamber has an outlet on the underside of the grid oriented such that the high velocity air stream issuing therefrom flows in a direction which extends generally transversely of the lower portion of the grid, the upper portion of the grid extending in a direction inclined to said direction of flow of the high velocity air stream at a substantially lesser angle than said lower portion of the grid.

11. The combination called for in claim 10 including a downwardly inclined chute for depositing the mixture of workpieces and chips on the portion of the grid intermediate its upper and lower end portions.

12. The combiantion called for in claim 11 wherein the lower end of the chute is positioned below the upper end of said grid.

13. The combination called for in claim 10 wherein said bleed passageway extends in an upwardly inclined direction from the intermediate portion of the grid to adjacent the upper end portion thereof.

14. The combination called for in claim 13 wherein said bleed passageway has an inlet for said high velocity air stream which is substantially greater in cross section than said outlet orifice.

15. The combination called for in claim 13 wherein said bleed passageway is of generally decreasing cross sectional area in a direction toward said outlet orifice.

16. A device for separating workpieces from a mixture of workpieces and machining chips which comprises a perforated grid on which said mixture is deposited, means forming a high pressure chamber below said grid, means forming a low pressure chamber above said grid, said low pressure chamber having a first portion extending downwardly from above the grid to a level below the upper end of the grid and laterally offset therefrom, said low pressure chamber also having a second portion extending upwardly from the lower end of said first portion so that air passing upwardly through said grid into said low pressure chamber is caused to flow downwardly through said first portion and then upwardly through said second portion, means at the bottom of said first portion for collecting airborne chips in the air stream and a blower for producing a high velocity air stream, said blower having its inlet connected with the upper end of the second portion of the low pressure chamber and its outlet connected with said high pressure chamber so as to form a substantially continuous recirculating air passageway between the high and low pressure chambers and thereby provide a generally trapped environment for said recirculating air.

17. The combination called for in claim 16 including means at the lower end of said low pressure chamber for collecting oil deposited from the air flowing from the first to the second portion of the low pressure chamber.

18. The combination called for in claim 16 wherein said high and low pressure chambers are dimensioned such that the velocity of the air flow in the high pressure chamber is substantially higher than in the low pressure chamber.

19. The combination called for in claim 16 including means cooperating with the bottom side of the grid to define a bleed passageway between said high and low pressure chambers for diverting a portion of the air in the high pressure chamber across the bottom side of the grid into the low pressure chamber.

20. A device for separating workpieces from a mixture of workpieces and machining chips which comprises a perforated grid which is inclined to the horizontal and on which said mixture is deposited, means forming a high pressure chamber for directing a stream of high velocity air against the underside of said grid, means forming a low pressure chamber above the grid so that the high pressure air stream is adapted to propel the chips in the mixture deposited on the grid upwardly and over the upper end of the grid into said low pressure chamber, said low pressure chamber having a first portion extending downwardly from above the grid to a level below the upper end of the grid and laterally offset therefrom, said low pressure chamber also having a second portion extending upwardly from the lower end of said first portion so that air passing upwardly through said grid into said low pressure chamber is caused to flow downwardly through said first portion and then upwardly through said second portion, means at the bottom of said first portion for collecting airborne chips in the air stream and a blower for producing a high velocity air stream, said blower having its inlet connected with the upper end of the second portion of the low pressure chamber and its outlet connected with said high pressure chamber so as to form a substantially continuous recirculating air passageway between the high and low pressure chambers and thereby provide a generally trapped environment for said recirculating air.

References Cited

UNITED STATES PATENTS

| 512,300 | 1/1894 | Johnston | 209—137 |
| 1,126,240 | 1/1915 | McKenzie | 209—137 |
| 1,987,640 | 1/1935 | Rothgarn | 209—136 |
| 2,022,588 | 11/1935 | Dickerson | 209—467 |
| 2,852,137 | 9/1958 | Hagopian | 209—139 |

FOREIGN PATENTS

| 626,782 | 3/1936 | Germany. |
| 413,294 | 7/1934 | Great Britain. |

TIM R. MILES, Primary Examiner

U.S. Cl. X.R.

209—380